United States Patent [19]

Sato

[11] 4,090,224
[45] May 16, 1978

[54] APPARATUS FOR PREVENTING INADVERTENT ERASURE OF CASSETTE TAPE

[75] Inventor: Masaaki Sato, Hachioji, Japan

[73] Assignee: Olympus Optical Co., Ltd., Tokyo, Japan

[21] Appl. No.: 716,448

[22] Filed: Aug. 20, 1976

[30] Foreign Application Priority Data

| Aug. 29, 1975 | Japan | 50-118938[U] |
| Aug. 29, 1975 | Japan | 50-118939[U] |
| Sep. 1, 1975 | Japan | 50-120507[U] |

[51] Int. Cl.² .............. G11B 15/04; G11B 5/12; G11B 23/08
[52] U.S. Cl. .............................. 360/60; 360/118; 360/132
[58] Field of Search .................. 360/60, 118, 132

[56] References Cited

U.S. PATENT DOCUMENTS

| 3,677,556 | 7/1972 | Oosone | 360/60 |
| 3,718,774 | 2/1973 | Kosaka | 360/60 |
| 3,997,916 | 12/1976 | Staar | 360/60 |

Primary Examiner—Robert S. Tupper
Attorney, Agent, or Firm—Ostrolenk, Faber, Gerb & Soffen

[57] ABSTRACT

Apparatus for preventing an inadvertent erasure of a cassette tape in a cassette tape recorder or transcriber which has the function of erasing the full tape width or all the tracks during a rapid advance or a rewind operation. The apparatus disables the full width erasure upon detection of any one of those lugs which are provided on the part of a cassette for purpose of preventing an inadvertent erasure.

5 Claims, 19 Drawing Figures

APPARATUS FOR PREVENTING INADVERTENT ERASURE OF CASSETTE TAPE

BACKGROUND OF THE INVENTION

The invention relates to an apparatus for preventing an inadvertent erasure of a cassette tape which is adapted for use in a cassette tape recorder, and more particularly, to such apparatus for use in a tape recorder or transcriber capable of erasing the full tape width or all the tracks during a rapid advance or a rewind operation.

Dictating machines and transcribers principally for office use are already known which have the function of simultaneously erasing the full tape width during a rapid advance or a rewind operation, thus meeting the need for a rapid tape erasure.

On the other hand, tape cassettes are usually provided with a lug or lugs associated with each side of the cassette which can be broken away to permit detection means therefor to prevent an inadvertent erasure of the record on the tape. However, with the above arrangement having the full width erasing capability, the erasure of the full tape width is activated whenever any one of the lugs is left or regardless of the presence or absence of the lugs. This is obviously inconvenient when it is desired to leave the record on one side intact.

In addition, a difficulty is involved in properly arranging an erase head capable of full width erasure with respect to a compact cassette or a miniature cassette, which is sometimes referred to as micro-cassette, because of space and constructional limitations.

SUMMARY OF THE INVENTION

It is an object of the invention to provide an apparatus to detect the removal or breakage of any one of lugs on a tape cassette loaded and to disable the full tape width in a cassette tape recorder or transcriber capable of erasing the full tape width.

It is another object of the invention to provide a proper positioning of a magnetic head for full tape width erasure relative to a customary small size tape cassette such as commonly referred to as compact cassette, micro-cassette or the like.

BRIEF DESERIPTION OF THE DRAWINGS

DESCRIPTION OF EMBODIMENTS

Figure 1:
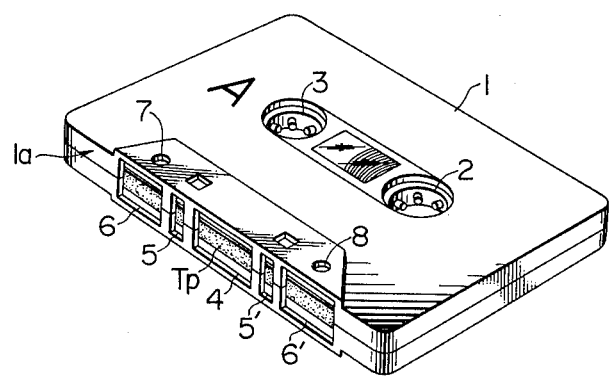
FIG. 1 is a perspective view of a well known compact cassette, showing the front end face thereof.

Referring to FIG. 1, there is shown a compact cassette 1 in perspective, which may be used with the present invention. As is conventional, the cassette 1 includes a pair of tape hubs 2, 3 rotatably disposed therein, and a length of magnetic tape Tp has its one end secured to one of the hubs, extended in a taut condition along a plurality of windows formed in the front end face 1a of the cassette to be subsequently taken up on the other hub, to which its other end is anchored. The windows include a central window slot 4 for receiving a record/playback head, a pair of small window slots 5, 5' located on the opposite sides of the slot 4, and a pair of outermost window slots 6, 6' for receiving a pinch roller or an erase head, respectively. A pair of capstan apertures 7, 8 are formed to extend vertically through the both major surfaces of the cassette 1 at positions forward the front end face 1a.

Figure 2:
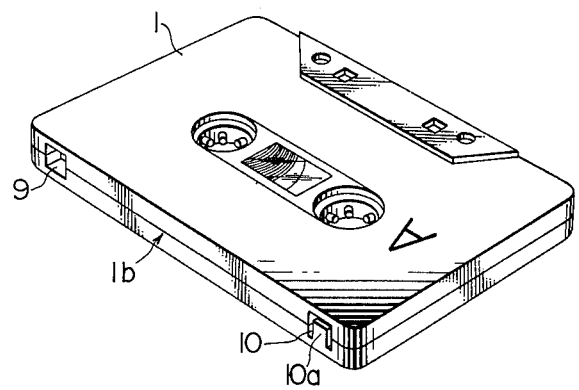
FIG. 2 is a perspective view of the same cassette, showing the rear thereof.

FIG. 2 is a perspective view of the cassette 1 as viewed from the rear side thereof, and illustrates the provision of a pair of detection openings 9, 10 associated with the respective sides B, A of the cassette which are provided for preventing an inadvertent erasure. The openings 9, 10 are formed in the rear end face 1b of the cassette. The opening 10 is shown as closed by a lug 10a while a corresponding lug is broken away in the opposite end to expose the opening 9.

Figure 3:
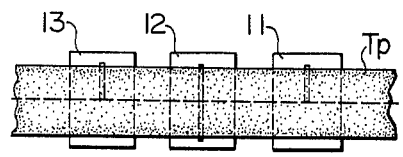
FIG. 3 is a fragmentary side elevation illustrating one disposition of magnetic heads relative to the compact cassette in the arrangement of the invention.

FIG. 3 shows the positional relationship between the heads and the tape which is chosen in accordance with the invention in a two track, two channel arrangement. Disposed along the tape path are a half width record/playback head 11, a full width erase head 12 and a half width erase head 13, which are located to extend into the slots 4, 5 and 6, respectively, shown in FIG. 1. The slot 6' is adapted to receive a pinch roller 14 shown in FIG. 4.

Figure 4:
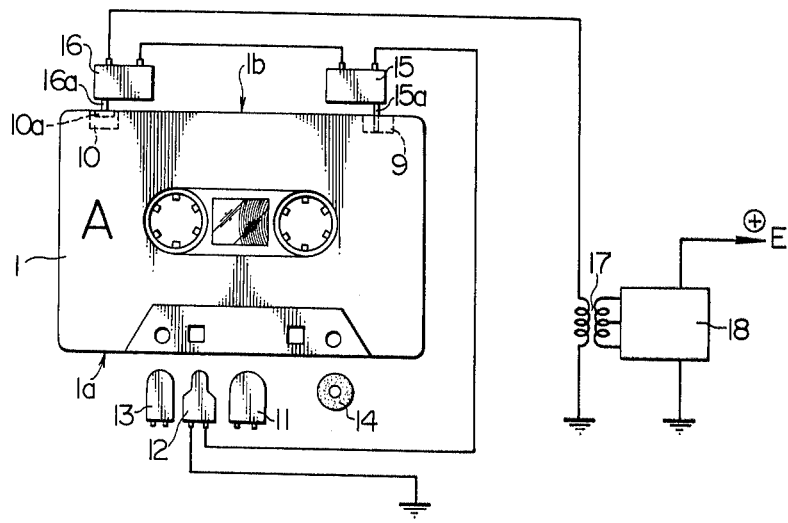
FIG. 4 is a schematic electric wiring diagram of the apparatus for preventing an inadvertent erasure constructed in accordance with one embodiment of the invention, also showing the relative location of its parts with respect to a compact cassette.

Referring to FIG. 4, there is shown an embodiment of the invention which disables a full width erasure in an electrical manner whenever any one of the lugs is removed from the detection openings 9, 10 of the cassette loaded. In the embodiment, there are provided a pair of detection switches 15, 16 in the form of known normally open microswitches which are positioned so as to be located opposite to the detection openings 9, 10 when the cassette is loaded on a tape recorder, not shown. Each of the switches 15, 16 has an actuator pin 15a, 16a which is urged to close the switch in the presence of a associated lug, but which allows the switch to remain open in the absence of such lug.

As shown in FIG. 4, the microswitches 15, 16 are electrically connected in series. Specifically, an oscillator 18 is connected between a power supply E and the ground, and is coupled through a transformer 17 to feed the full width erase head 12 through the series combination of the microswitches 16, 15. Thus it will be seen that the erase head 12 is electrically energized only when the both microswitches are closed.

When one of the lugs is removed as exemplified by the cassette 1 shown in FIG. 2, the lug 10a urges the actuater pin 16a to close the microswitch 16, but the absence of a corresponding lug in the detection opening 9 allows the actuator pin 15a to extend into it, thus allowing the microswitch 15 to remain open. As a result, the head 12 cannot be fed from the oscillator 18, failing to effect a full width erasure. The same applies when a lug in the detection opening 9 is present while the lug 10a is removed. Thus, the full width erasure is only enabled when the lugs are present in the both detection openings 9, 10.

Figure 5:
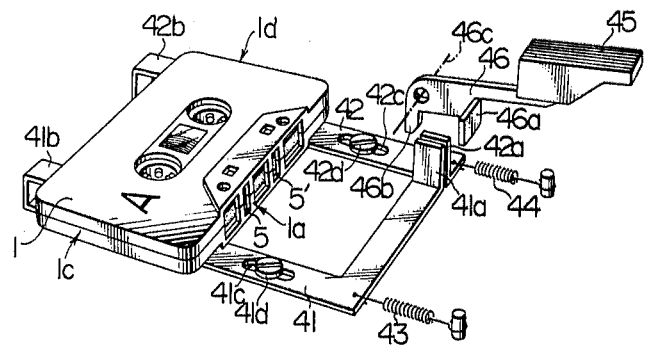
FIG. 5 is a perspective view of the apparatus constructed in accordance with another embodiment of the invention adapted for use with a compact cassette.

Referring to FIG. 5, there is shown a mechanism which performs a full width erasure by selectively operating the heads 11 to 13 in response to the depression of a full width erasure button 45. The mechanism includes a pair of detecting levers 41, 42 which are located at a level below the cassette 1 loaded and are slidable in a direction parallel to opposite lateral sides 1c, 1d of the cassette. At this end, each of the levers is centrally formed, with the elongate slots 41c, 42c extending in a direction parallel to the sides 1c, 1d and which is engaged by the headed screws 41d, 42d which engage the body of the tape recorder, not shown. On one side of the slot, each lever is engaged by one end of the tension springs 43, 44, the other end of which are fixed to a stationary pin, whereby the lever is urged to move to the right, as viewed in FIG. 5. However, the extent of movement of these levers is limited by the slots 41c, 42c. At its left-hand end, as viewed in FIG. 5, the respective lever is folded upward to form a channel configuration, with its free end defining the detecting pieces 41b, 42b which are located opposite to the detection openings, 9, 10 when the cassette 1 is loaded. The portion of the lever 41 remote from said left-hand end with respect to the slot 41c is bent to extend parallel to the front end face 1a of the cassette before rising upright to define a locking tip 41a. In the similar manner, the other end of the lever 42 extends parallel to the front end face 1a and toward the tip 41a before rising upright to define a locking tip 42a. The tips 41a, 42a are of an identical condiguration and closely adjacent to each other.

The button 45 is formed as an integral part of an erase lever 45 which is pivotally mounted on a stationary pin 46c, and is urged by bias means (not shown) to rotate counter-clockwise until it bears against a suitable stop, not shown. The end of the erase lever 46 remote from the button 45 extends downward to form a pusher 46b which is located opposite to a support lever 53 (see FIGS. 6 and 7) supporting the full width erase head 12. A tab 46a extends from the lower edge of the lever 46 adjacent to the button 45, in a direction at right angles to the remainder of the lever 46, and is close to but spaced above the locking tips 41a, 42a of the detecting levers 41, 42.

Figure 6:
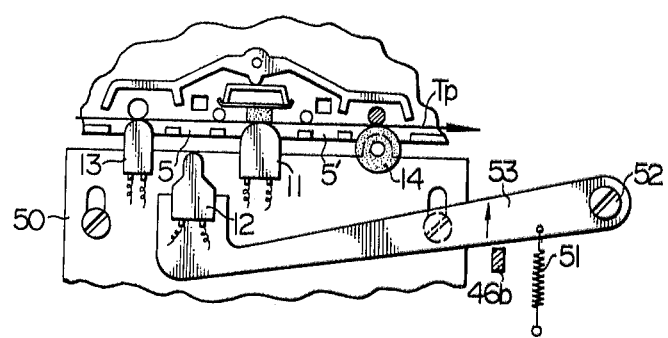
FIGS. 6 and 7 are schematic side elevations illustrating different operational positions of the apparatus shown in FIG. 5.
Figure 7:
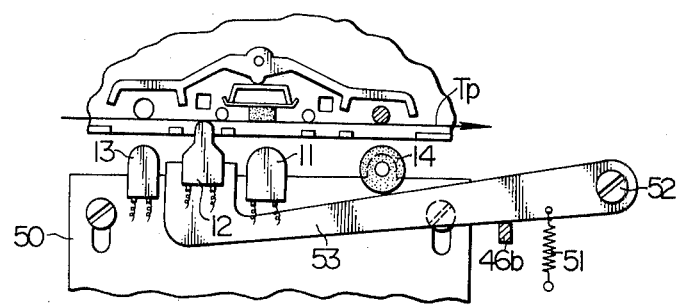

The support lever 53 is fully shown in FIG. 6 wherein it will be noted that it is pivotally mounted on a pin 52 which is secured to the body of the tape recorder, and carries the head 12 on its free end so as to locate it opposite to the window slot 5 formed in the front end face of the cassette 1 (see FIGS. 1 and 5). A spring 51 has its one end engaged with the support lever 53 and its other end engaged with a stationary pin, thereby urging the lever 53 to rotate counter-clockwise about the pin 52. However, the resulting movement is limited by its abutment against the pusher 46b of the erase lever 46. It is to be understood that the heads 11, 13 and the pinch roller 14 is mounted on and supported by a sliding plate 50 which is slidable independently from the support lever 53, and a normal record/playback operation takes place by a movement of the plate 50 to its operative position.

The above mechanism operates as follows: Assuming that a cassette 1 having lugs in both of the detecting openings 9, 10 is loaded on a tape recorder as shown in FIG. 5, the detecting levers 41, 42 are driven to the left, as viewed in FIG. 5, against the resilience of the springs 43, 44 as these lugs bear the detecting pieces 41b, 42b. Consequently, the locking tips 41a, 42a at the other end of the levers 41, 42 also move to the left and runs out of alignment with the path of vertical movement of the tab 46a, thus permitting the button 45 to be depressed. As the button 45 is depressed, the pusher 46b drives the support lever 53 in the direction of an arrow (see FIG. 6) from its position shown in FIG. 6 to its position shown in FIG. 7 where the full width erase head 12 thereon comes to bear against the tape Tp. Thus when the tape is subject to a rapid advance or a rewind operation to run in the direction indicated by an arrow while the lever 53 assumes its position shown in FIG. 7, a full width erasure is performed by the head 12. It is to be noted that the sliding plate 50 remains in its inoperative position at this time, preventing the heads 11, 13 and the pinch roller 14 from functioning.

If a cassette 1 having a lug 10a in its detection opening 10 and no lug in its detection opening 9 is loaded, the detecting piece 41b of the detecting lever 41 is held in the position shown by the action of the lug 10a while the detecting piece 42b of the lever 42 is allowed to advance into the detection opening 9 under the resilience of the spring 44, moving the locking tip 42a into a position below the tab 46a, thus blocking a downward movement of the lever 46. Hence, the button 45 cannot be depressed, and consequently the pusher 46b remains in its position shown in FIG. 6, without operating the support lever 53. Thus the full width erase head 12 is held removed from the tape Tp, preventing a full width erasure.

A full width erasure is similarly prevented when the opening 9 is closed by an associated lug and the opening 10 is without a lug.

It is to be noted that instead of being located opposite to the window slot 5, the head 12 may be located opposite to the window slot 5' (see FIG. 1). The head 12 may comprise a coil which is energized by either alternating current or direct. Alternatively, it may be of a permanent magnet type. In addition, the described arrangement is not limited to a two channel, two track system, but is equally applicable to a four channel, two track system as used in stereophonic applications.

The use of the present invention with a micro-cassette will now be described with reference to FIGS. 8 to 19. As mentioned above, the full width erasure takes place during a rapid advance or a rewind operation when the tape speed is high. Because of this, a full width erasure may fail to operate satisfactorily as a result of tape bouncing in the absence of tape pads which urge the tape into bearing contact with a magnetic head. This difficulty is avoided in the arrangement to be described below by utilizing the pads which are normally not used.

A micro-cassette developed by the present applicant has a front end face having a central window slot formed therein for receiving a pinch roller, and a pair of outer window slots formed therein at symmetrical positions relative to the central slot for receiving a record/playback head. The cassette is provided with a pair of tape pads symmetrically located with respect to a capstan aperture at positions behind a tape path extending along the window slots. The tape pads in a pair are required because the capstan aperture is centrally formed as considered along the length of the front end face and the slots for receiving a record/playback head is symmetrically located on the opposite sides of the aperture so that one slot admits the head when the cassette is loaded with one side upside and the other admits it when the other side of the cassette is upside. The arrangement described below utilizes a free slot which does not admit the head to receive a full width erase head.

Figure 8:
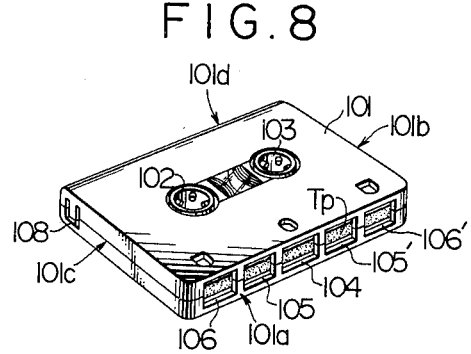
FIG. 8 is a perspective view of a known micro-cassette with which the invention may be utilized, illustrating the front end face thereof.
Figure 9:
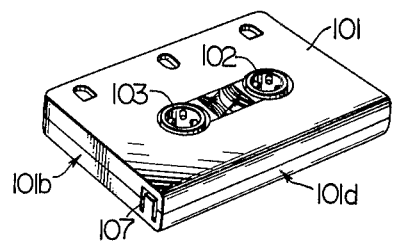
FIG. 9 is a perspective view of the micro-cassette showing the rear thereof.
Figure 10:
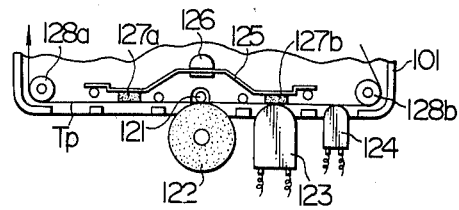
FIG. 10 is a schematic plan view, partly in section, illustrating the relative position of magnetic heads with respect to a tape path in a conventional micro-cassette.

More specifically, FIG. 8 shows a micro-cassette in perspective, illustrating the front end face thereof, while FIG. 9 shows the same micro-cassette as viewed from the rear end thereof. A micro-cassette 1 includes a pair of tape hubs 102, 103 rotatably disposed therein, and a length of magnetic tape has its one end anchored to one of the tape hubs to be disposed thereon. A leader portion of the tape is passed around a pair of guide rollers 128a, 128b (see FIG. 10) so as to extend along window slots formed in its front end face 101a, and is then anchored to the other tape hub. Formed in the front end face 101a are a central slot 104 for receiving a pinch roller 122 (see FIG. 10), a pair of window slots 105, 105' symmetrically located on the opposite sides of the slot 104 and adapted to receive a record/playback head 123, and another pair of window slots 106, 106' also symmetrically located on the opposite sides of the slot 104 and adapted to receive an erase head 124. Referring to FIGS. 8 and 9, it will be noted that the opposite lateral sidewalls 101b, 101c of the cassette are formed with lugs 107, 108, respectively, which may be broken off to prevent an inadvertent erasure of the record made on either side of the cassette. The heads and pinch roller are shown in bearing contact with the tape Tp during a record mode, as shown by a plan view of FIG. 10.

A capstan 121 is disposed behind the tape Tp in alignment with the pinch roller 122, and cooperates therewith to feed the tape Tp at a uniform rate in the direction of an arrow during its rotation. A leaf spring 125 which is centrally supported by a stationary support member 126 has a pair of tape pads 127a, 127b secured to its opposite ends, and one of the pads, 127b, gently urges the tape Tp against the head 123.

Figure 11:
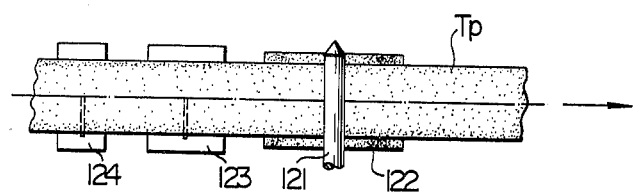
FIG. 11 is an enlarged side elevation showing the relationship between the heads of FIG. 10 and an associated capstan.

FIG. 11 shows the arrangement of the capstan 121, pinch roller 122, record/playback head 123 and erase head 124 with respect to the tape Tp, as viewed from the inside. The heads 123 and 124 operates on one-half the width of the tape, and a record is made thereon by the head 123 as it is fed in the direction of an arrow by cooperation of the capstan 121 and the pinch roller 122. During a playback operation, the erase head 124 is either deenergized if it is of a wound type or is retracted from the tape Tp if it is of a magnet type.

Figure 12:
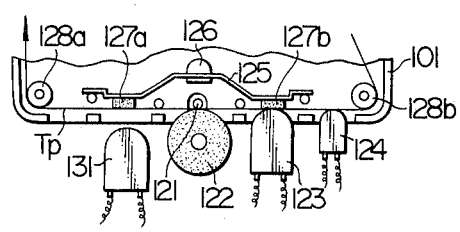
FIGS. 12 and 13 are schematic plan views, partly in section, of the full tape width erasing apparatus constructed in accordance with a further embodiment of the invention, illustrating the relationship of magnetic heads relative to a tape path in a micro-cassette.

In accordance with the invention, the fact that one of the window slots 105, 105' and one of the tape pads 127a, 127b are normally not used is utilized to permit a full width erase head 131 to enter the slot 105 (see FIG. 13) and to utilize the pad 127a to urge the tape thereagainst in a manner to avoid a bouncing of the tape when it is subjected to a rapid advance or a rewind operation under the control of a take-up shaft or a rewind shaft, neither shown, instead of being fed by the cooperation of the capstan 121 and the pinch roller 122. During a record mode or a playback mode as illustrated in FIG. 12, the head 131 must be held in a retracted position clear from the tape. However, with the head of a wound type which is deenergized or from which an erase current is interrupted, the pad 127a may be left in abutment against the tape provided the take-up or rewind shaft is supplied with a sufficient torque.

Figure 13:
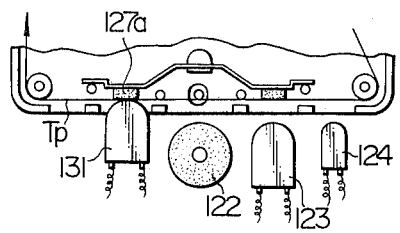
Figure 14:
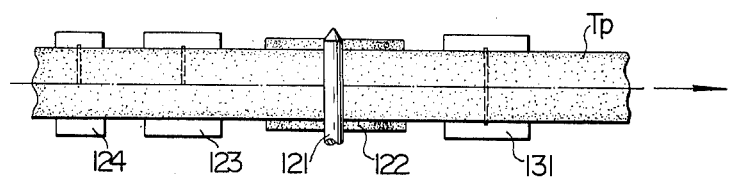
FIG. 14 is an enlarged side elevation showing the relationship between the heads of FIGS. 12 and 13 and an associated capstan.

In FIG. 13 wherein a full width erasure is performed by the head 131 during a rapid tape advance or a tape rewind operation, the pinch roller 122, record/playback head 123 and (half-windth) erase head 124 are shown removed from the tape, and remain inoperative. When a rapid advance is desired, the take-up shaft (not shown) provides a rapid feed of the tape Tp in the direction of an arrow, and if the head 131 is of a wound type, an erase current if fed thereto perform a full tape width erasure in a rapid manner. When a rewind is desired, the same erasure process takes please except that the tape runs in the opposite direction. FIG. 14 is a fragmentary view of the parts shown in FIG. 13, as viewed from the inside.

Figure 15:
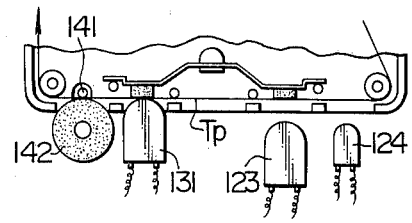
FIG. 15 is a schematic view, partly in section, of the full tape width erasing apparatus constracted in accordance with still another embodiment of the invention as applied to a micro-cassette.

FIG. 15 shows a modification of the arrangement shown in FIG. 13 wherein the tape recorder includes a side capstan which cooperated with a pinch roller 142 to feed the tape. In other respects, the construction and operation are quite similar to the arrangement of FIG. 13.

From the above description, it will be appreciated that the invention utilizes an idle tape pad to prevent a rocking or oscillating motion of the tape during a rapid advance or a rewind operation, without requiring a special pad for this purpose. This arrangement is particularly advantageous when used in a miniature size recorder which employs a micro-cassette where the stroke of a head as it is advanced into an associated window slot is reduced to diminish the tape tension.

Figure 16:
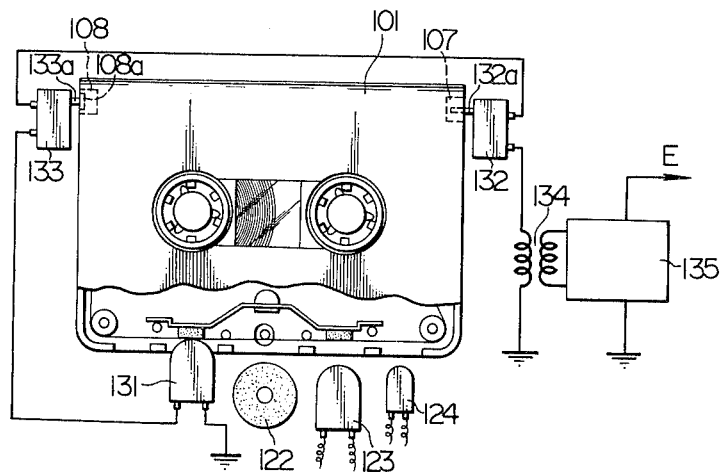
FIG. 16 is a schematic wiring diagram of the apparatus for preventing an inadvertent erasure of a micro-cassette tape according to a still further embodiment of the invention.

FIG. 16 shows a further embodiment of the invention which inhibits a full tape width erasure when any one of the lugs which are provided on the part of a tape cassette for preventing an inadvertent erasure of the record is removed or broken away. There is shown a tape cassette 101 having a pair of detection openings 107, 108 formed in its opposite lateral sides, which openings may be either covered with associated lugs to permit a further recording on the tape contained in the cassette or left open to inhibit an erasure of the record on the tape.

A pair of detection switches 132, 133 in the form of normally open microswitches are located so that their respective actuator pins 132a, 133a are urged into the switch closing position by the lugs, when present. When the lugs are absent or removed, the switches 132, 133 remain open. As shown in FIG. 16, there is provided an oscillator 135 which is fed from a power supply E. The output of the oscillator 135 is coupled through a transformer 134 with a series combination comprising the switches 132, 133 and a full width erase head 131, thus enabling the latter only when the both microswitches are closed.

With this arrangement, when a lug 108a is present in one of the detection openings 107, 108 while the other opening is without such lug, as illustrated in FIG. 16, the actuator pin 133a is urged by the lug 108a into the position in which it closes the microswitch 133, but the actuator pin 132a is allowed to enter the detection opening 107, whereby the microswitch 132 remains open. As a consequence, the head 131 connot be energized by the oscillator output, thus preventing a full width erasure. When the lug is present in the opposite opening 107 while the opening 108 is without such lug, a full width erasure is inhibited in the similar manner. In this manner, the full width erasure by the head 131 is only enabled when the both detection openings 107, 108 are closed by lugs.

Figure 17:
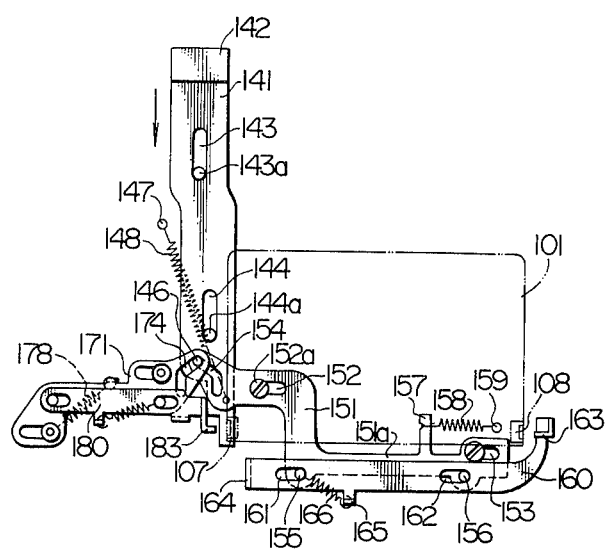
FIG. 17 is a plan view of the apparatus for preventing an inadvertent erasure of a micro-cassette tape according to an additional embodiment of the invention.
Figure 18:
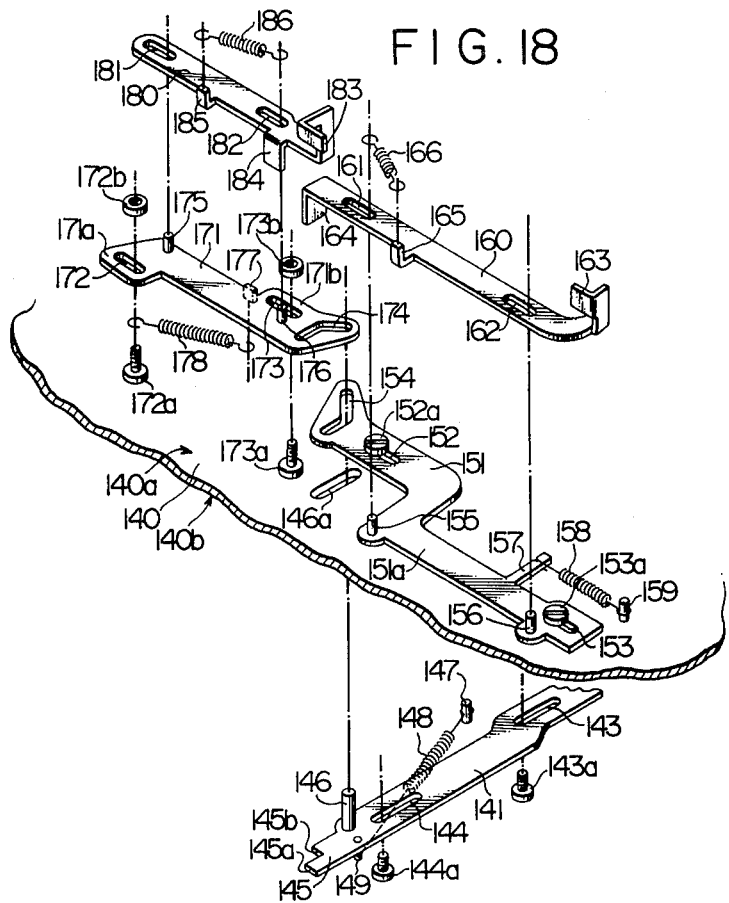
FIG. 18 is an exploded, perspective view of the apparatus shown in FIG. 17.
Figure 19:
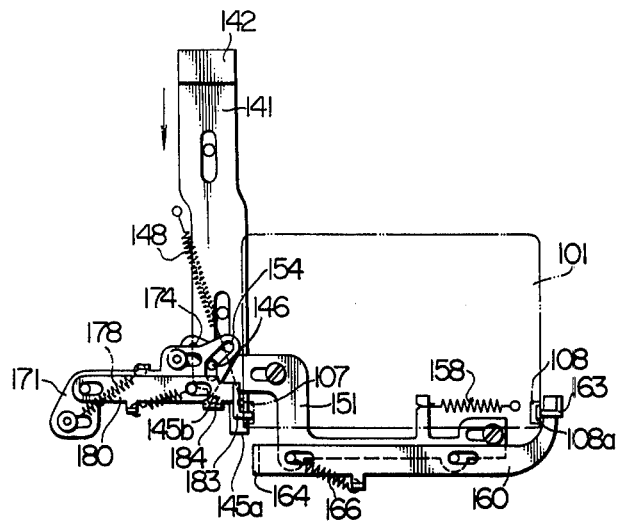
FIG. 19 is a plan view of the apparatus shown in FIG. 17 in its operative position.

Referring to FIGS. 17 to 19, an additional embodiment will be described below which inhibits a full width erasure through mechanical means. Referring to these Figures, the arrangement essentially comprises an erase lever 141 which is slidably disposed on the rear surface 140b of a stationary plate 140 (see FIG. 18) of a tape recorder, not shown; a pair of sliding plated 151, 171 which are disposed on the upper surface 140a of the stationary plate 140 so as to be slidable in a direction perpendicular to the direction of sliding movement of the lever 141 in a symmetrical manner with respect to the latter; and a pair of detecting levers 160, 180 mounted on the sliding plates 151, 171, respectively, so as to be slidable in the same direction as the latter and each carrying the detection pieces 163, 183.

As shown in FIG. 18, the erase lever 141 is formed with a pair of spaced elongate slots 143, 144, through which headed screws 143a, 144a extend to be threadably secured to the rear surface 140b of the stationary plate 140. Adjacent to its one end, the lever 141 fixedly carries a pin 149, which is engaged by one end of a spring 148, the other end of which is anchored to a stationary pin 147 secured to the plate 140, thus urging the lever 141 to move in an upward direction as viewed in FIG. 17. The resulting movement is limited by the abutment of the lower edge of the slots 143, 144 with the shank of the headed screws 143a, 144a. An erase button 142 is fixedly mounted on the opposite end of the lever 141, and can be depressed to activate a full tape width erasure.

Toward said one end, the erase lever 141 fixedly carries a pin 146, which extends through an elongate slot 146a formed in the stationary plate 140 to engage slots 154, 174 which are formed in the sliding plates 151, 171, respectively. The lower end 145 of the lever 141 is notched to form a pair of detents 145a, 145b, which are located adjacent to tabs 164, 184 formed on the detecting levers 160, 180, respectively, as will be further described later.

In its left-hand end, the sliding plate 151 is formed with the curved slot 154 which initially extends substantially at an angle of 45° with and then extends in a direction perpendicular to the direction of sliding movement thereof. Adjacent to its opposite ends, the sliding plate 151 is formed with a pair of elongate slots 152, 153, through which headed screws 152a, 153a extend before being threadably secured to the upper surface 140a of the stationary plate 140. The slots 152, 153 extend parallel to each other, and in this manner the plate 151 is slidable along the length of these slots. The plate 151 is centrally formed with a laterally extending ear 157, which is engaged by one end of a spring 158, the other end of which is anchored to a stationary pin 159 on the plate 140, thus urging the plate 151 to shift to the right. However, the resulting movement is limited by the abutment of the left-hand edge of the slots 152, 153 against the screws 152a 153a.

The right-hand portion 151a of the plate 151 is offset from the left-hand portion thereof including the curved slot 154 by a bend formed therein, and a pair of guide pins 155, 156 are fixedly mounted on the plate portion 151a at its opposite ends. These guide pins extend through a pair of elongate slots 161, 162 formed in the detecting lever 160, which is disposed directly on the plate portion 151a. The slots 161, 162 extend in a direction parallel to the direction of sliding movement of the plate 151, and their engagement with the guide pins 155, 156 enable the detecting lever 160 to slide over the plate 151 in a direction along the slots 161, 162. The lever 160 is centrally formed with an upright piece 165 folded from one lateral edge thereof, and a spring 166 extends between the piece 165 and the top end of the guide pin 155, thus urging the lever 160 to shift lengthwise to the left relative to the sliding plate 151. However, the resulting movement is limited by the abutment of the right-hand edge of the slots 161, 162 against the guide pins 155, 156. The right-hand end of the lever 160 is bent at right angles to the remainder, and the folded into an upright piece, from which the detecting piece 163 is bent at right angles. The detecting piece 163 is adapted to be located adjacent to the detection opening 108 in the cassette so as to be able to detect the presence or absence of a lug therein. The left-hand end of the lever 160 is bent at right angles downward to form the tab 164 mentioned previously, which is located adjacent to the detent 145a.

The other sliding plate 171 and the other detecting lever 180 are formed in a somewhat symmetrical configuration with respect to the above described sliding plate 151 and detecting lever 160. Specifically, the sliding plate 171 is formed with the curved slot 174 in its right-hand end, the slot 174 initially extending at an angle of approximately 45° with and then extending in a direction perpendicular to the direction of sliding movement of the plate 171. Adjacent to its opposite ends, the plate 171 has portions 171a, 171b of an increased width in which are formed elongate slots 172, 173 extending in a direction parallel to the direction of sliding movement of the plate 171. A pair of stepped screws 172a, 173a extend through these slots 172, 173 and threadably engage the surface 140a of the stationary plate 140, thus making the plate 171 slidable in overlying relationship with the sliding plate 151. The step of the stepped screws 172a, 173a is at an elevation which is equal to the thickness of the plate 151, and a pair of nuts 172b, 173b are threadably engaged with the screws to hold the plate 171 in place above the sliding plate 151. Toward its opposite ends, the plate 171 fixedly carries a pair of guide pins 175, 176, which are adapted to fit in elongate slots 181, 182 formed in the detecting lever 180 as will be further described later.

The detecting lever 180 is disposed on the sliding plate 171. The opposite end regions of the lever 180 have an increased width and have the slots 181, 182 formed therein, the engagement between these slots and the guide pins 175, 176 enabling the lever 180 to slide over the plate 171 in a direction along the length of the slots 181, 182. The lever 180 is centrally formed with a folded ear 185, engaged by one end of a spring 178, the other end of which is engaged with the top end of the guide pin 176 on the plate 171, thus urging the lever 180 to shift to the right relative to the plate 171. However, the resulting movement of the lever 180 is limited by the abutment of the left-hand edge of the slots 181, 182 against the guide pins 175, 176. At its right-hand end, one lateral edge of the lever 180 is folded in an upward direction, partly severed from the body thereof, and the severed portion is bent outwardly at right angles to the length of the lever 180, thus forming the detecting piece 183 which is located adjacent to the detection opening 107 in the cassette. Toward this end, the lever 180 is formed with the tab 184 depending downwardly from the opposite lateral side from the detecting piece 183, the tab 184 being located adjacent to the detent 145b of the erase lever 141.

In operation, when the erase lever 141 assumes an inoperative position shown in FIG. 17, the spring 148 holds the lever 141 in its uppermost position, as viewed in this Figure, in which the screws 143a, 144a bear against the lower edge of the slots 143, 144, with the pin 146 engaging the uppermost edge of the curved slots 154, 174 formed in the sliding plates 151, 171, respectively. When the erase button 142 is now depressed to move the lever 141 in the direction of an arrow against the resilience of the spring 148 until the guide pins 143a, 144a bear against the upper edge of the slots 143, 144, a full width erase head (not shown) is activated. This activation may be accomplished by a simple operaton of an electrical switch, while minimizing an additional space requirement. The position of the cassette 101 loaded is shown in phantom lines in FIG. 17, and the arrangement is such that the depression of the erase button 142 is disable to inhibit a full width erasure whenever any one of lugs in the detection openings 107, 108 (refer FIG. 16) is removed.

Specifically, FIGS. 17 and 19 show a cassette 101 having a lug 108a in the detection opening 108 and having no lug in the other opening 107. Under this situation, as the button 142 is depressed, the pin 146 moves in a downward direction, as viewed in these Figures. As a result of the engagement between the pin 146 and the upper, inclined slot portion of the curved slots 154, 174, the sliding plates 151, 171 begin to move foward each other in a direction perpendicular to the movement of the erase lever 141 while overcoming the resilience of the respective springs 158, 178. When the pin 146 has moved downward to a point where it reaches the junction between the inclined and the straight portion of the respective slots 154, 174, the detecting piece 163 of the detecting lever 160 slidably disposed on the plate 151 moves into abutment against the lug 108a of the cassette 101 and can no longer move to the left, so that the tab 164 at the left-hand end of the lever 160 cannot move into the path of movement of the detent 145a on the erase lever 141. However, the detecting piece 183 of the lever 180 slidably disposed on the sliding plate 171 is free to move into the detection opening 107 while sliding over the plate 171. Thus, the tab 184 formed on the right-hand end of the lever 180 is permitted to move into the path of movement of the detent 145b on the erase lever 141, and engages therewith to prevent a further downward movement of the lever 141. This inhibits a full width erasure.

When the opening 107 is closed by an associated lug while the opening 108 is left open, a similar operation takes place, moving the tab 164 on the lever 160 into the path of movement of the detent 145a on the erase lever 141 and causing the tab 164 to engage with it. In this manner, a further depression or downward movement of the lever 141 is again prevented, even though the tab 184 does not engage the detent 145b at this time.

When the both openings 107, 108 are without lugs, it will be readily apparent that the both tabs 164, 184 engage with the detents 145a, 145b, respectively, thus effectively preventing a further downward movement of the erase lever 141 and thus inhibiting a full width erasure.

From the foregoing description, it will be appreciated that the invention has achieved the object initially mentioned while minimizing the space requirement, in particular, in a miniature size tape recorder which employs a micro-cassette. While the invention has been illustrated and described with reference to a tape recorder which used a compact cassette or a micro-cassette of known form, it should be understood that the invention is equally applicable to any tape recorder or transcriber which is adapted to use a tape cassette having lugs in its rear end face or opposite lateral sides for indicating the character described.

What is claimed is:

1. In combination, a cassette tape recorder and a cassette therefor; the tape in said cassette having plural tracks;

said cassette having at least one erasure prevention lug extending therefrom;

said tape recorder having a record/playback head and tape drive means selectively providing rapid advance and rewind of the tape;

said tape recorder also having erasing means including a full tape width erasing head operable during said rapid advance and said rewind;

and detection means extending at least partially in the region of said lug for detecting the presence and absence of said lug;

said detection means being operably connected to said erasing means to disable full width erasure when the said lug is not present;

said lug being removable to prevent full width erasure of a record on the tape.

2. An apparatus according to claim 1 in which said cassette includes a pair of lugs and said detection means includes a pair of normally open microswitches connected in series with the full width erase head.

3. An apparatus according to claim 1 in which said cassette includes a pair of lugs and said detection means includes an erase lever, and a pair of detecting levers for detecting the presence and absence of an associated one of a pair of said lugs on said cassette, the erase lever including a detent means, the detecting levers being each formed with a tab which is brought into engagement with the corresponding detent means on the erase lever when the absence of a lug is detected, thereby inhibiting a full width erasure.

4. An apparatus according to claim 1 in which two window slots are formed in the cassette and the cassette is also provided with a central window slot for receiving the record/playback head and a pair of end window slots for receiving selectively a pinch roller and an erase head; said two window slots being respectively located between said central window slot and said end window slots; said full width erasing head being selectively received in one of said cassette window slots.

5. An apparatus according to claim 1 which said tape cassette has a pair of tape pressure pads, one of the tape pads bearing against said record/playback head through the magnetic tape, the other tape pad bearing against the full tape width erase head through the magnetic tape.

* * * * *